US008038884B2

(12) United States Patent
Bargeman et al.

(10) Patent No.: US 8,038,884 B2
(45) Date of Patent: *Oct. 18, 2011

(54) PROCESS TO PREPARE CHLORINE-CONTAINING COMPOUNDS

(75) Inventors: Gerrald Bargeman, Wageningen (NL); René Lodewijk Maria Demmer, Enter (NL); Antoon Ten Kate, Arnhem (NL); Boris Kuzmanovic, Essen (DE); Cornelis Elizabeth Johannus Van Lare, Wijchen (NL); Mateo Jozef Jacques Mayer, Amersfoort (NL); Maarten André Irène Schutyser, Wageningen (NL); Jan Barend Westerink, Lochem (NL)

(73) Assignee: Akzo Nobel N.V., Arnhem (NL)

( * ) Notice: Subject to any disclaimer, the term of this patent is extended or adjusted under 35 U.S.C. 154(b) by 830 days.

This patent is subject to a terminal disclaimer.

(21) Appl. No.: 11/884,564

(22) PCT Filed: Feb. 13, 2006

(86) PCT No.: PCT/EP2006/050870
§ 371 (c)(1),
(2), (4) Date: Mar. 25, 2008

(87) PCT Pub. No.: WO2006/087303
PCT Pub. Date: Aug. 24, 2006

(65) Prior Publication Data
US 2008/0169202 A1 Jul. 17, 2008

Related U.S. Application Data

(60) Provisional application No. 60/654,078, filed on Feb. 18, 2005.

(30) Foreign Application Priority Data

Jul. 18, 2005 (EP) .................................... 05106573

(51) Int. Cl.
B01D 11/00 (2006.01)
C22B 26/10 (2006.01)

(52) U.S. Cl. ........ 210/639; 210/644; 210/651; 210/805; 423/499.4; 423/499.5; 423/499.1; 205/464; 205/473; 205/503

(58) Field of Classification Search .................. 204/525, 204/527, 538; 210/638, 639, 641, 650, 651, 210/749, 805, 806, 636, 644; 205/464, 473, 205/498, 502, 503, 618; 423/462, 491, 499.1, 423/499.4, 499.5, 500, 641
See application file for complete search history.

(56) References Cited

U.S. PATENT DOCUMENTS

| 3,419,492 | A | * | 12/1968 | Bloch | 210/673 |
|---|---|---|---|---|---|
| 3,578,589 | A | * | 5/1971 | Hwa et al. | 210/701 |
| 3,619,424 | A | * | 11/1971 | Blanchard et al. | 210/645 |
| 4,038,365 | A | | 7/1977 | Patil et al. | |
| 4,156,645 | A | * | 5/1979 | Bray | 210/652 |
| 4,176,022 | A | | 11/1979 | Darlington | |
| 4,303,624 | A | | 12/1981 | Dotson et al. | |
| 4,911,844 | A | | 3/1990 | Linder et al. | |
| 5,158,683 | A | | 10/1992 | Lin | |
| 5,254,257 | A | | 10/1993 | Brigano et al. | |
| 5,256,303 | A | | 10/1993 | Zeiher et al. | |
| 5,458,781 | A | | 10/1995 | Lin | |
| 5,858,240 | A | | 1/1999 | Twardowski et al. | |
| 6,004,464 | A | | 12/1999 | Lien | |
| 6,036,867 | A | | 3/2000 | Jogand et al. | |
| 6,331,236 | B1 | * | 12/2001 | Mani | 204/525 |
| 7,083,730 | B2 | * | 8/2006 | Davis | 210/652 |
| 7,459,088 | B2 | * | 12/2008 | Davis | 210/702 |
| 2003/0000897 | A1 | | 1/2003 | Mayers | |
| 2003/0049197 | A1 | | 3/2003 | Mayers | |
| 2003/0205526 | A1 | * | 11/2003 | Vuong | 210/652 |
| 2004/0055955 | A1 | * | 3/2004 | Davis | 210/652 |
| 2006/0157410 | A1 | * | 7/2006 | Hassan | 210/637 |

FOREIGN PATENT DOCUMENTS

| DE | 33 38 194 | 5/1985 |
|---|---|---|
| EP | 1 202 931 | 5/2002 |
| GB | 2 395 946 | 6/2004 |
| JP | 2101-887 | 10/1985 |
| WO | 96/33005 | 10/1996 |
| WO | 01/04052 | 1/2001 |
| WO | 02/102713 | 12/2002 |

(Continued)

OTHER PUBLICATIONS

Saline Lakes, The largest, highest & lowest lakes of the world!, Soil & Water Conservation Society of Metro Halifax (SWCSMH), Nova Scotia, Canada, Jan. 5, 2006, downloaded from the internet on Feb. 18, 2011.*
Elsevier Publishing Company, *Chlor-Alkali Industry*, pp. 92-96, (1971).
Pletcher, D., et al., "Sodium Chlorate and Sodium Bromate," *Industrial Electrochemistry*, 2nd Ed., pp. 269-273, (1990).
International Search Report, International Application No. PCT/EP2006/050870, mailed May 2, 2006.
International Preliminary Report on Patentability and Written Opinion, International Application No. PCT/EP2006/050870, Jun. 1, 2007.

(Continued)

*Primary Examiner* — Joesph Drodge
(74) *Attorney, Agent, or Firm* — Kenyon & Kenyon LLP

(57) ABSTRACT

The present invention relates to process to prepare a chlorine-containing compound using an aqueous salt solution containing at least 100 g/l of sodium chloride and a contaminating amount of polyvalent cations comprising the steps of (i) preparing an aqueous salt solution containing at least 100 g/l of sodium chloride and at least 0.01 ppm of polyvalent cations by dissolving a sodium chloride source in water, (ii) adding an effective amount of at least one positive retention enhancing component to the aqueous solution, (iii) subsequently subjecting the solution to a nanofiltration step, thereby separating the solution into a retentate which is enriched for polyvalent cations and a permeate which is the purified aqueous salt solution, (iv) reacting the chloride anions in the permeate to a chlorine-containing compound by an electrolysis step, and (v) recycling at least part of the retentate to dissolution step (i).

20 Claims, No Drawings

FOREIGN PATENT DOCUMENTS

| WO | 03/006377 | 1/2003 |
| WO | 03/031033 | 4/2003 |
| WO | 2004/096404 | 11/2004 |

OTHER PUBLICATIONS

Jian-xin Ren, "Membrane Separation Technology and Application Thereof," 1st Edition, Chemical Industry Publishing House, Jan. 2003, p. 13, (English-language translation of Chinese document).

Ding-yi Yu et al., Membrane Separation Engineering and Typical Examples of Design, 1st Edition, Chemical Industry Publishing House, Jan. 2005, pp. 174-179, (English-language translation of Chinese document).

International Search Report, International Application No. PCT/EP2006/050869, mailed Apr. 5, 2006.

International Preliminary Report on Patentability and Written Opinion, International Application No. PCT/EP2006/050869, Feb. 19, 2007.

* cited by examiner

PROCESS TO PREPARE CHLORINE-CONTAINING COMPOUNDS

REFERENCE TO RELATED APPLICATION(s)

This application claims the benefit of U.S. Provisional Application No. 60/654,078 filed on Feb. 18, 2005.

The present invention relates to a process to prepare chlorine-containing compounds starting from an aqueous salt solution containing at least 100 g/l of sodium chloride and a contaminating amount of polyvalent cations.

In aqueous salt solutions containing at least 100 g/l of sodium chloride from a natural source a plurality of anions and cations, such as magnesium, calcium, strontium, iron, and sulphate, are present. In the preparation process of salt and the preparation processes of products wherein salt is a raw material, most of these anions and cations are to be removed. Until today, in general it has been impossible to remove polyvalent ions such as calcium, magnesium, strontium, iron, and/or sulphate from an aqueous salt solution to a significant degree other than by a process comprising the addition of a large amount of soda and concentrated NaOH solution to the aqueous salt solution and subjecting the solution to multiple settling steps, after which the aqueous salt solution is subjected to a multiple evaporation process. The relatively pure salt so produced can be sold as is and constitutes a suitable raw material for other processes of which the major one is the production of chlorine-containing compounds, such as chlorine and sodium chlorate. For these production processes of chlorine-containing compounds, the salt is again dissolved in water and the chloride anions are reacted to chlorine-containing compounds by an oxidation step, for example by an electrolysis process.

The above state of the art process to prepare chlorine-containing compounds comprises many steps which require large reactors and settlers, therefore lowering the economic attractiveness. Also, a large amount of chemicals, such as soda and caustic, is needed, which is undesired. Moreover, the state of the art process requires a not too heavily contaminated aqueous salt solution as a starting material, as it has become clear that aqueous salt solutions comprising a large amount of impurities are impossible to purify to a sufficient degree using the state of the art process.

Further, if it were possible to substantially remove polyvalent ions from an aqueous salt solution containing at least 100 g/l of sodium chloride, it would no longer be required to first prepare a dried salt, only for it to be re-dissolved in water for further processing in a subsequent step. Also, if it were possible to remove polyvalent ions from an aqueous solution containing at least 100 g/l of sodium chloride to a greater extent, this aqueous solution might be of a lower quality, i.e. might contain a higher amount of undesired polyvalent ions, but would remain suitable for the production of chlorine-containing compounds.

Hence, there is a need in the market for a process to prepare a chlorine-containing compound wherein an aqueous salt solution comprising at least 100 g/l of sodium chloride, more specifically a concentrated brine, is purified to substantially remove polyvalent ions therefrom, which purified solution subsequently can be further reacted to give the chlorine-containing compound.

U.S. Pat. No. 5,858,240 discloses a chloralkali process wherein salt solutions comprising at least 50 g/l of sodium chloride are purified by a nanofiltration step to remove undesirable ions therefrom and subsequently reacted to chlorine or sodium chlorate by an electrolysis step. However, the retention of calcium and magnesium as disclosed in this document is still subject to improvement. Especially, as demonstrated by the examples of this reference, when the amount of sodium chloride in the aqueous salt solution is increased, the retention of calcium decreases strongly, the calcium retention being 56.3% when the sodium chloride concentration is 139.6 g/l and only 12.3% when the sodium chloride concentration is increased to 288.7 g/l. Consequently, the purification step wherein these undesired ions are removed from the aqueous salt solution becomes more troublesome as the salt concentration increases, since the (undesired) passage of calcium ions through the nanofiltration membrane together with the purified salt solution increases considerably at higher salt concentrations.

GB 2,395,946 relates to a process wherein seawater is purified by subjecting the solution to a nanofiltration step. The seawater is sent to a nanofiltration process with a higher rejection of sulphate ions relative to sodium ions or chloride ions. Subsequently, the permeate from the nanofiltration process is sent to a thermal desalination process in order to increase the sodium chloride concentration in the water. Finally, the sodium chloride is precipitated out in a crystallizer. The retentate obtained after the nanofiltration step may be discharged to an outfall, or it could be sent to a process for mineral recovery of components such as magnesium, sulphate, or calcium. It is mentioned that in the nanofiltration process one has to ensure that the brine concentration is sufficiently low to prevent precipitation of calcium carbonate. GB 2,395,946 does not disclose the nanofiltration of concentrated sodium chloride streams, i.e. aqueous salt solutions comprising at least 100 g/l of sodium chloride.

U.S. Pat. No. 4,176,022 describes a method of electrolyzing an alkali metal chloride brine in an electrolytic cell having an anolyte compartment separated from a catholyte compartment by a semi-permeable barrier which method comprises (i) maintaining a calcium ion-containing brine alkaline, (ii) adding a phosphate chosen from the group consisting of phosphoric acid, sodium orthophosphate, sodium metaphosphate, sodium polyphosphate, potassium polyphosphate, and mixtures thereof to said alkaline brine forming an insoluble precipitate having the stoichiometric formula $(CaX_2).(Ca(PO_4)_2)_3$ wherein X is chosen from the group consisting of F, Cl, and OH, (iii) separating the precipitate from the brine, (iv) feeding the brine, containing less than 20 parts per billion of calcium ion, to the anolyte compartment of the cell, and (v) passing an electrical current through the cell. In summary, this reference discloses a process for removing calcium from a brine wherein an additive is added to the brine which will form an insoluble stoichiometric complex with the calcium ions present therein and which is subsequently to be removed by filtration and discarded. This reference as a consequence is not concerned with a process where the additive is recyclable, making the process less attractive economically. Further, it was found that the feed as disclosed in U.S. Pat. No. 4,176, 022 is not suitable for being subjected to a nanofiltration step, since nanofiltration membranes are sensitive to mechanical damage of the top layer due to any solids present in the feed.

We have found a process to prepare chlorine-containing compounds, in particular chorine and sodium chlorate, wherein in one step the retention of polyvalent ions, like calcium, in aqueous solutions containing at least 100 g/l of sodium chloride can be significantly increased, so that in a subsequent step the chloride anion can be directly reacted to give the desired chlorine-containing compound.

In more detail, the invention provides a process to prepare a chlorine-containing compound using an aqueous salt solution containing at least 100 g/l of sodium chloride and at least 0.01 ppm of polyvalent cations comprising the steps of (i) preparing an aqueous salt solution containing at least 100 g/l of sodium chloride and at least 0.01 ppm of polyvalent cations by dissolving a sodium chloride source in water,
(ii) adding an effective amount of at least one positive retention enhancing component to the aqueous solution,
(iii) subsequently subjecting the solution to a nanofiltration step, thereby separating the solution into a retentate which is enriched for polyvalent cations and a permeate which is the purified aqueous salt solution,
(iv) reacting the chloride anions in the permeate to a chlorine-containing compound by an electrolysis step, and
(v) recycling at least part of the retentate to dissolution step (i).

By the term "positive retention enhancing component" is meant any additive which, when added to an aqueous solution comprising calcium and other polyvalent cations such as magnesium, strontium, iron, barium and/or aluminium, will lead to an increase in retention of calcium and preferably also in retention of one or more of the polyvalent cations selected from the group consisting of magnesium, strontium, iron, barium and aluminium, when this solution is subjected to a nanofiltration step. In order to determine whether or not an additive is suitable for use as a positive retention enhancing component (PREC) in the process according to the present invention, the following test can be used.

A synthetic brine is prepared by dissolving 1,120 g of ultrapure sodium chloride ex Merck in 3,600 g of water. Subsequently, 17.04 g of $Na_2SO_4$ and 13.2 g of $CaCl_2$ are dissolved in the synthetic brine. The resulting brine, denoted as synthetic brine, is fed into a DSS lab-stak M20 unit containing 0.036 $m^2$ of the nanofiltration membrane Desal®5DK (ex GE/Osmonics). The membrane unit is operated at 30 bar pressure and ambient temperature with a cross-flow rate of 600 l/h. The unit is operated for 1 hour in total recycle mode (retentate and permeate are recycled to the feed vessel). Subsequently, a permeate sample of 50 ml is collected and the Ca retention is determined by measuring the Ca concentrations of a permeate and a retentate sample after acidification and dilution with nitric acid using simultaneous Inductively Coupled Plasma-Emission Spectrometry (ICP-ES). This is the blank experiment. In a second experiment, 300 ppm of an additive is added to said synthetic raw brine. If a precipitate is formed, the additive is considered not to be suitable for use as a PREC in the process according to the invention. If formation of a precipitate is not visually observed, the just-described nanofiltration experiment is repeated. The additive is considered to be a positive retention enhancing component if for the Ca retention an absolute increase of at least 5% is observed as compared to the blank experiment.

It has surprisingly been found that when using the above process, in step (iii) an absolute increase in the retention of calcium of at least 5%, preferably 7%, most preferably at least 10% is observed as compared to a process wherein the same aqueous solution without the positive retention enhancing component is subjected to such a nanofiltration step. The at least 5% absolute increase in retention can be achieved for all claimed aqueous salt solutions, i.e. solutions having a sodium chloride concentration ranging from 100 g/l up to those that are saturated and even supersaturated in their sodium chloride concentration. It is noted that if in a process wherein an aqueous solution not comprising a positive retention enhancing component is subjected to a nanofiltration step (i.e. in a blank experiment) the observed retention of calcium is already between 90% and 97%, employing the process according to the present invention will still result in an increase in retention, yet the absolute increase will be smaller than 5% although it will be at least 1%. It is noted that if the retention of calcium is already more than 97% for the blank, an increase in retention upon addition of a positive retention enhancing component is still to be expected, but this will no longer have practical use. Preferably, the process according to the present invention is therefore employed for a brine of which the retention of calcium in the absence of a positive retention enhancing component lies between 2 and 97%, more preferably, between 4 and 90%, most preferably, between 5 and 75%.

It is furthermore noted that generally also an increase in retention of other polyvalent cations present in the aqueous salt solution, such as magnesium, strontium, iron barium, and/or aluminium, is observed. The observed absolute increase in retention usually also exceeds 5%.

The PREC used in the process according to the present invention is preferably selected from the group consisting of polycarboxylic acids, polyacrylates, polymaleic acids, oligopeptides, polypeptides, polymers bearing two or more ester groups or carboxyalkyl groups and optionally also phosphate, phosphonate, phosphino, sulphate and/or sulphonate groups; sugars, such as functionalized or unfunctionalized monosaccharides, disaccharides, and poly-saccharides; ferrocyanide salts; quaternary ammonium salts; cyclodextrines; urea; polymers bearing amino groups; polymers bearing one or more alcohol groups; polymers bearing quaternary ammonium groups; polymers comprising nitrogen-containing aliphatic rings; sodium salts of polymers bearing anionic groups; chloride salts of polymers bearing cationic groups; surfactants from a natural source such as disproportionated rosin acid soap; lactic acid; phospholipids; a suspension of yeast cells; a suspension of algae; maleic anhydride homopolymer; amylase; protease; sodium citrate; citric acid; nonanoyloxybenzene sulphonate; polyepoxysuccinic acid; polyacrylamide; sodium ethylenediamine tetraacetate; ethylenediamine tetramethylene phosphonic acid; sulphonated polyoxyethylene ethers; fatty acids; orange juice; apple juice; and Fe(II) or Fe(III) iron complexes with one of the above-mentioned compounds.

More preferably the PREC is selected from the following group of components that contain no or a very low amount of nitrogen: polycarboxylic acids, polyacrylic acids, polymaleic acids, and polymers bearing two or more ester groups or carboxyalkyl groups and optionally also phosphate, phosphonate, phosphino, sulphate and/or sulphonate groups; sugars, such as functionalized or unfunctionalized monosaccharides, disaccharides, and polysaccharides; cyclodextrines; polymers bearing one or more alcohol groups; sodium salts of polymers bearing anionic groups; surfactants from a natural source such as disproportionated rosin acid soap; lactic acid; a suspension of yeast cells; a suspension of algae; maleic anhydride homopolymer; sodium citrate; citric acid; sulphonated polyoxyethylene ethers; fatty acids; orange juice; apple juice; and Fe(II) or Fe(III) iron complexes with one of the above-mentioned compounds. Nitrogen-containing components are less preferred, since they will give difficulties in electrolysis operations because of the formation of $NCl_3$. Especially when $NCl_3$ accumulates, which is the case if chlorine gas is liquefied as is common in commercial electrolysis operations, its formation is highly undesired because the resulting product is explosive.

In an even more preferred embodiment the PREC is selected from the group of ecologically sound components: (poly)carboxylic acids, phosphinocarboxylic acids, polyacrylic acids, polymaleic acids, glucose, sucrose, saccharose or other sugars, and sodium gluconate.

Most preferred is a PREC selected from the group of the following large molecular compounds: phosphinocarboxylic acids, preferably used as the 40% aqueous solution Belsperse® 164 ex Jianghai Chemical Co.; polymaleic acids, preferably used as the 50% aqueous solution Drewsperse® 747A ex Ashland Inc.

Typically, the total amount of PRECs that needs to be added in step (ii) of the process according to the present invention to be effective (i.e. to effectuate an absolute 5% increase in retention for at least the polyvalent cation calcium compared to the blank) is at least 15 ppm. Preferably, the total amount of PRECs added in step (ii) of the process is at least 25 ppm, more preferably at least 35 ppm, and most preferably at least 50 ppm. Preferably, the total amount of PRECs added in step (ii) of the process according to the present invention is less than 5,000 ppm, more preferably less than 1,000 ppm, even more preferably less than 500 ppm, and most preferably less than 350 ppm. The PREC may be added to the aqueous salt solution in pure form (solid or liquid) or as a solution in water.

An additional advantage of the process according to the present invention is that sulphate ions that may be present in an aqueous salt solution will also be removed during the nanofiltration step, because of the generally good to excellent sulphate retention properties of the nanofiltration membranes suitable for use in the present process. The low sulphate content of the purified aqueous salt solution (i.e. the permeate of step (iii) of the present process) has the following advantages. Firstly, the electrolysis step will be less disturbed by the presence of hindering sulphate ions. Secondly, the purge stream of the final oxidation step, i.e. the electrolysis step, is significantly reduced. In for example the chlorine production process, depleted brine is recycled to the salt dissolver to resaturate brine originating from the electrolyzers back to preferably about 310 g/L. A recycle flow of depleted brine in conventional processes typically has the drawback that impurities in the process will accumulate, which requires the presence of a purge. Commonly, the magnitude of the purge flow is determined by the concentration of sulphate in the depleted brine to be recycled. With the nanofiltration process according to the invention, the amount of sulphate in the solution being subjected to the electrolysis step can be decreased as compared to state of the art processes not comprising a nanofiltration step. Accordingly, the purge flow is reduced, making the process even more economically attractive.

To achieve the above-indicated polyvalent cation removal, no subsequent crystallization step or other treatment of the permeate is needed.

As a result of the above process, the purified aqueous salt solution resulting from step (iii) is of such purity that it can be used directly for the subsequent step (iv) in which the purified aqueous salt solution is a raw material, i.e. the production of chlorine-containing compounds.

The chlorine-containing compounds that may be prepared by the process according to the invention include chlorine and sodium chlorate. Sodium chlorate, $NaClO_3$, is a white, hygroscopic crystalline solid. The rapid growth in demand for sodium chlorate over the last decade owes much to the introduction of chlorate derived chlorine dioxide bleaching in the pulp and paper industry. Its second main application is as an intermediate in the production of the chlorates of other metals (e.g. potassium chlorate used in matches and explosives, barium chlorate used in fireworks, and calcium chlorate used as a herbicide). Other uses are as an oxidizing agent in metallurgical operations and as an additive in agricultural products and dyes.

Sodium chlorate is prepared according to this invention by subjecting the permeate obtained in step (iii) of the process according to the invention to a conventional electrolysis step, to produce chlorine, sodium hydroxide, and hydrogen. The chlorine and the sodium hydroxide are reacted to form sodium hypochlorite, which is then converted to chlorate and chloride, preferably under controlled conditions of pH and temperature, as is generally known in the art. Preferably, the permeate is first made faintly acidic before it is subjected to the electrolysis step to produce sodium chlorate. Furthermore, the solution preferably contains small amounts of oxidizing agents such as potassium dichromate to prevent the hydrogen liberated in the electrolysis from reducing the chlorate. Solid chlorate can be separated from the cell effluent by fractional crystallization, as is also generally known in the art.

Most preferred is the preparation of chlorine. Chlorine is prepared according to this invention by subjecting the permeate obtained in step (iii) of the process according to the invention to an electrolysis step, to produce chlorine, sodium hydroxide, and hydrogen, with the electrolysis cell in which the electrolysis step is preferably carried out being designed such that reaction between chlorine and caustic soda is prevented, as is generally known in the art. The electrolysis step according to the invention includes electrolysis processes such as membrane electrolysis, diaphragm electrolysis, chlorate electrolysis, and mercury electrolysis. Most preferably, it is a membrane electrolysis step.

An optional polishing step may be performed in the process according to the invention. In a preferred embodiment such an additional polishing step takes place between step (iii) and step (iv) of the process. The polishing step may include feeding the aqueous solution to an ion exchange process in order to remove the last traces of polyvalent ions from the system. Especially, when step (iv) involves a membrane electrolysis step, an additional ion exchange step between step (iii) and step (iv) is much preferred. It is noted that in the aqueous salt solution resulting from step (iii) of the process according to the invention so many polyvalent ions have been removed already that the optional ion exchange step can be performed at very low chemical cost.

Preferably, the aqueous salt solution in the processes of the present invention comprises at least 150 g/l of sodium chloride, more preferably at least 200 g/l, even more preferably at least 250 g/l, even more preferably still at least 300 g/l; most preferred is a saturated sodium chloride solution.

In an alternative embodiment of the process according to the present invention the concentration of sodium chloride may be adjusted to be at least 100 g/l in a step subsequent to or simultaneously with the addition of at least one positive retention enhancing component to the aqueous solution and before nanofiltration step (iii).

It is noted that the term "salt source" as used throughout this document is meant to denominate all salts of which more than 25% by weight is NaCl. Preferably, such salt contains more than 50% by weight of NaCl. More preferably, the salt contains more than 75% by weight of NaCl, while a salt containing more than 90% by weight NaCl is most preferred. The salt may be solar salt (salt obtained by evaporating water from brine using solar heat), rock salt, and/or subterraneous salt deposits. When said salt source is dissolved in water to yield an aqueous salt solution comprising at least 100 g/l of sodium chloride, it will comprise a total amount of at least 0.01 ppm of polyvalent cationic contaminants. The required amount of one or more positive enhancing components according to the present invention is added to the thus prepared aqueous solution. However, it is also possible to add the PRECs to the salt source prior to the dissolution step or to the water prior to the dissolution step. A combination of these procedures is also possible.

Preferably, the salt source is a subterraneous salt deposit exploited by means of dissolution mining. If the salt source is rock salt or solar salt, it is preferably transported to a salt dissolver to which water is added in order to prepare the aqueous salt solution according to the present invention. The water may be from any water source conventionally used for this purpose such as well water or surface water.

At least part of the retentate is recycled to dissolution step (i). Hence, it is recycled to the salt dissolver or to the subterraneous salt deposit. Recycling the retentate to the dissolver or the subterraneous salt deposit has the following advantages. The aqueous salt solution which is subjected to the nanofiltration step comprises at least one positive retention enhancing component (PREC). A recycle of the retentate to the dissolver thus reduces the amount of PRECs that needs to be added to said aqueous salt solution. Furthermore, because polyvalent ionic impurities are significantly retained by the nanofiltration membrane, these will accumulate in the brine that is recycled to the dissolver or the subterraneous salt deposit. Eventually, they will reach their solubility limits and, thus, they will be deposited, e.g. in the form of anhydrite or polyhalite, at the bottom of the dissolver, where they can be easily removed via the sludge, or at the bottom of the cavern of the subterraneous salt deposit.

In this embodiment it is possible to add one or more conventional retarding agents such as for example described in EP 1 404 614 to the dissolver or the subterraneous salt deposit in order to further reduce the amount of contaminations present in the salt source that will dissolve in the aqueous salt solution.

In another embodiment the polyvalent cations comprise besides calcium, the polyvalent cations magnesium, strontium, iron, barium, aluminium or a mixture of two or more of those cations. In a further embodiment the contaminating amount of polyvalent cations in the aqueous solution which is to be subjected to a nanofiltration step is less than 20,000 ppm and at least 0.01 ppm, more preferably less than 10,000 ppm, even more preferably less than 4,000 ppm and most preferably less than 2,000 ppm. Preferably, the contaminating amount is at least 0.1 ppm, even more preferably at least 10 ppm, most preferably at least 100 ppm.

In another embodiment of the processes according to the invention, the amount of either calcium or magnesium in the aqueous salt solution to be subjected to a nanofiltration step is less than 2,000 ppm, preferably less than 1,800 ppm, more preferably less than 1,600 ppm, most preferably less than 1,400 ppm. More preferably, the combined amount of calcium and magnesium is less than 2,500 ppm, preferably less than 2,000.

In yet another preferred embodiment of the processes of the invention, the amount of sulphate anions in the aqueous salt solution to be subjected to a nanofiltration step is less than 75,000 ppm, preferably less than 50,000 ppm, more preferably less than 25,000 ppm, most preferably less than 10,000 ppm, and most preferably less than 8,000 ppm.

It is noted that the "nanofiltration membrane", which is placed inside a membrane nanofiltration unit, as referred to throughout this specification is meant to denote any conventional nanofiltration membrane designed to selectively reject divalent and other polyvalent anions and having a molecular weight cut-off of at least 100 Da, preferably at least 150 Da, and wherein the molecular weight cut-off is at most 25,000 Da, preferably at most 10,000 Da, more preferably at most 2,500 Da, and most preferably at most 1,000 Da. The nanofiltration system preferably utilizes semipermeable membranes of the nanofiltration type, such as those sold as FilmTec® NF270 (The Dow Chemical Company), DESAL® 5DK, DESAL® 5DL, and DESAL® 5HL (all GE/Osmonics), NTR® 7250 (Nitto Denko Industrial Membranes), and AFC®-30 (PCI Membrane Systems LTD). These and similar membranes suitable for use in the process according to the present invention are effective for rejecting a high percentage of all divalent anions and especially sulphate and carbonate, as indicated by an observed sulphate retention in excess of 80% and preferably in excess of 90% during processing of a 1 g/L $MgSO_4$ solution in demineralized water in full recycle operation, while permitting passage through the membrane of a high percentage of all monovalent anions and especially chloride and bromide, as indicated by a chloride retention below 80% and preferably below 70% during processing of a 1 g/L NaCl solution in demineralized water in full recycle operation. Tests with these solutions should be conducted at ambient temperature, a membrane flux of between 20 l/m²·h and 30 l/m²·h, and a cross-flow velocity to avoid strong concentration polarization. Sodium chloride and magnesium sulphate retentions in these tests can be determined using calibrated conductivity measurements. Although a nanofiltration-type semipermeable membrane such as the membrane types mentioned earlier is preferred, other nanofiltration membranes having these high divalent ion rejection characteristics are commercially available and may alternatively be employed.

The process according to the present invention is further illustrated by the following examples.

EXAMPLES

In the examples the following definition is used:
Retention={1−(concentration of component in permeate/concentration of component in retentate)}×100%

Example 1

An experiment was performed using two membrane types, a 4-inch spiral wound NF®270 polyamide thin film NF membrane (ex DOW Chemical Company FilmTec™) and a 4-inch spiral wound Desal® 5DK polyamide NF membrane (ex GE/Osmonics) with 7.6 m² and 8.4 m² membrane surface area, respectively. The membrane modules were tested in parallel in a pilot unit, which was operated in continuous feed and bleed operation mode at a cross-flow rate of around 3 m³/h per membrane module. Mother liquor obtained from a sodium chloride crystallizer was supplied to the unit. The pH of the mother liquor was reduced to pH 10.7 using a concentrated (35%) $H_2SO_4$ solution. Furthermore, 101 ppm of a positive retention enhancing component was added to the mother liquor by the addition of 202 ppm of Drewsperse®747A ex Ashland Inc., which is a 50% aqueous solution of polymaleic acid. The resulting mother liquor sent to the membrane pilot unit contained, amongst others, 280 g/l NaCl, 0.25 meq/L calcium, 0.06 meq/L strontium and 1,190 meq/L $SO_4^{2-}$. The majority of the retentate was recycled to the membrane feed line (cross-flow operation), while part of the retentate was purged together with the permeate to obtain a concentration factor (the ratio of the fresh feed flow over the purged retentate flow) of approximately 1.3. During membrane filtration at 32 bar pressure and 40° C. calcium retentions of 99% were obtained for Desal® 5DK and NF®270 and strontium retentions of 88%.

Comparative Example 2

Another experiment was performed using two membrane types, flat sheet NF®270 polyamide thin film NF membranes (ex DOW Chemical Company FilmTec™) and flat sheet Desal® 5DK polyamide NF membranes (ex GE/Osmonics). The membrane types were tested simultaneously in a DSS lab stack unit, which was operated in continuous feed and bleed operation mode at a cross-flow rate of 600 L/h. In total 0.144 m² membrane surface area was installed. Mother liquor obtained from a sodium chloride crystallizer was supplied to the unit. The pH of the mother liquor was reduced to pH 10.8 using a concentrated $H_2SO_4$ solution. No positive retention enhancing component was added. The mother liquor sent to the DSS unit contained, amongst others, 1,150 meq/L $SO_4^{2-}$, 296 g/l NaCl, 1.3 mg/l $Ca^{2+}$, and 655 mg/l $Br^-$. Membrane filtration was performed at 50 bar pressure and 32° C. temperature. The majority of the retentate was recycled to the membrane feed line (cross-flow operation), while part of the retentate was purged together with permeates to obtain a concentration factor of approximately 1.3. The membranes showed calcium retentions below 32%.

Comparative Example 3

Another experiment was performed using two membrane types, flat sheet NF®270 polyamide thin film NF membrane (ex DOW Chemical Company FilmTec™) and flat sheet Desal® 5DK polyamide NF membrane (ex GE/Osmonics). The membrane types were tested simultaneously in a DSS lab stack unit, which was operated in total recycle mode (total retentate and permeates were recycled to the membrane supply vessel) at a cross-flow rate of 600 L/h. In total 0.36 m² membrane surface area was installed. Raw brine obtained from a brine source was supplied to the unit. No positive retention enhancing component was added. The raw brine sent to the DSS lab stack unit contained, amongst others, 1.21 g/l $SO_4^{2-}$, 273 g/l NaCl, 3.3 mg/l strontium, 10.3 mg/l magnesium, and 494 mg/l $Ca^{2-}$. Membrane filtration was performed at 21 bar pressure and 22° C. temperature. Desal® 5DK and NF®270 showed 36% and 24% calcium retention, respectively, and strontium retentions below 59%. The magnesium retentions for Desal® 5DK and NF®270 were found to be 68% and 66%, respectively. The sulphate retentions for Desal® 5DK and NF®270 were found to be 94.2% and 95.9%, respectively.

Example 4

An experiment was performed using two membrane types, a 4-inch spiral wound NF®270 polyamide thin film NF membrane (ex DOW Chemical Company FilmTec™) and a 4-inch spiral wound Desal® 5DK polyamide NF membrane (ex GE/Osmonics) with 7.6 m² and 8.4 m² membrane surface area, respectively. The membrane modules were tested in parallel in a pilot unit, which was operated in continuous feed and bleed operation mode at a cross-flow rate of 3.1 m³/h and 2.6 m³/h per membrane module for NF®270 and Desal® 5DK, respectively. Mother liquor obtained from a sodium chloride crystallizer was supplied to the unit. The pH of the mother liquor was reduced to pH 10.6 using a concentrated (35%) $H_2SO_4$ solution. Furthermore, 96 ppm of a positive retention enhancing component was added to the mother liquor by the addition of 192 ppm of Drewsperse® 747A (see Example 1). The resulting mother liquor sent to the membrane pilot unit contained, amongst others, 280 g/l NaCl, 0.046 meq/L fully dissolved calcium, and 1,125 meq/L $SO_4^{2-}$. The majority of the retentate was recycled to the membrane feed line (cross-flow operation), while part of the retentate was purged together with the permeate to obtain a concentration factor (the ratio of the fresh feed flow over the purged retentate flow) of approximately 1.3 and 1.2 for NF®270 and Desal® 5DK, respectively. During membrane filtration at 32 bar pressure and 34° C. and 39° C. for NF®270 and Desal® 5DK, respectively, calcium retentions of 96% and 97%, respectively, were obtained for Desal® 5DK and NF®270.

Example 5

Another experiment was performed using two membrane types, flat sheet NF®270 polyamide thin film NF membrane (ex DOW Chemical Company FilmTec™) and flat sheet Desal® 5DK polyamide NF membrane (ex GE/Osmonics), and a raw brine from the same source as specified in Comparative Example 3. Furthermore, 300 ppm of a positive retention enhancing component was added to the raw brine, by addition of 600 ppm Drewsperse® 747A (see Example 1). The membrane types were tested simultaneously in a DSS lab-stack unit, which was operated in total recycle mode (the total retentate and the permeates were recycled to the membrane supply vessel) at a cross-flow rate of 600 L/h. In total 0.216 m² membrane surface area was installed. Raw brine obtained from a brine source was supplied to the unit. The raw brine sent to the DSS lab stack unit contained, amongst others, 1.11 g/l $SO_4^{2-}$, 289 g/l NaCl, 3.0 mg/l strontium, 10.1 mg/l magnesium, and 490 mg/l $Ca^{2+}$. Membrane filtration was performed at 31 bar pressure and 21° C. temperature. Desal® 5DK and NF®270 showed 79% and 50% calcium retention, respectively, strontium retentions of 90% and 70%, respectively, and magnesium retentions of 93% and 79%, respectively. Both membranes showed 0.6% chloride retention. Desal® 5DK and NF®270 showed 96.8% and 98.5% sulphate retention, respectively.

Comparative Example 6

An electrolysis experiment was performed using a laboratory membrane electrolysis cell with the permeate produced in Comparative Example 3 as a feed stream. The experiments were executed at a constant current of 5 A between the anode and the cathode. After about 3 hours, the electrolysis process was stopped because the potential difference over the membrane exceeded 4V.

Example 7

An electrolysis experiment was performed with the same electrolysis equipment and under the same process conditions as described in Comparative Example 6, but now using the permeate produced in Example 5. After 6 hours of operation, the laboratory set-up was still running and the potential difference over the membrane was below 4V.

As demonstrated by the above examples, the retention of calcium and strontium ions using the process according to the invention is significantly increased compared to processes where no positive retention enhancing component is added to the aqueous salt solution before it is subjected to a nanofiltration step, and therefore the resulting aqueous salt solution can be directly and suitably used for reacting the chloride anions to chlorine in an electrolysis process.

The invention claimed is:
1. A process to prepare chlorine or sodium chlorate using an aqueous salt solution containing at least 100 g/l of sodium chloride and a contaminating amount of polyvalent cations comprising the steps of
   (i) preparing an aqueous salt solution containing at least 100 g/l of sodium chloride and at least 0.01 ppm of polyvalent cations by dissolving a sodium chloride source containing more than 25% by weight sodium chloride in water, (ii) adding an effective amount of at least one positive retention enhancing component to the aqueous solution, (iii) subsequently subjecting the solution to a nanofiltration step—using a nanofiltration membrane having a molecular weight cut-off of between 100 Da and 10,000 Dalton, thereby separating the solution into a retentate which is enriched for polyvalent cations and a permeate which is the purified aqueous salt solution, (iv) reacting the chloride anions in the permeate to chlorine or sodium chlorate by an electrolysis step, and (v) recycling at least part of the retentate to dissolution step (i).

2. The process according to claim 1 further comprising adjusting the concentration of sodium chloride to be at least 100 g/l in a step subsequent to or simultaneous with step (ii) of adding the positive retention enhancing component to the aqueous solution and before nanofiltration step (iii).

3. The process according to claim 1 wherein the aqueous solution comprises at least 300 g/l of sodium chloride.

4. The process according to claim 1 wherein the at least one positive retention enhancing component is selected from the group consisting of polycarboxylic acids; polyacrylates; polymaleic acids; oligopeptides; polypeptides; polymers bearing two or more ester groups or carboxyalkyl groups; sugars; ferrocyanide salts; quaternary ammonium salts; cyclodextrines; urea; polymers bearing amino groups; polymers bearing one or more alcohol groups; polymers bearing quaternary ammonium groups; polymers comprising nitrogen-containing aliphatic rings; sodium salts of polymers bearing anionic groups; chloride salts of polymers bearing cationic groups; surfactants from a natural source; lactic acid; phospholipids; a suspension of yeast cells; a suspension of algae; maleic anhydride homopolymer; amylase; protease; sodium citrate; citric acid; nonanoyloxybenzene sulphonate; polyepoxysuccinic acid; polyacrylamide; sodium ethylenediamine tetraacetate; ethylenediamine tetramethylene phosphonic acid; sulphonated polyoxyethylene ethers; fatty acids; orange juice; apple juice; and Fe(II) or Fe(III) iron complexes with one of the above-mentioned compounds.

5. The process according to claim 4 wherein the polymers bearing two or more ester groups or carboxyalkyl groups also bear a member of the group consisting of phosphate groups, phosphonate groups, phosphino groups, sulphate groups, sulphonate groups and combinations thereof; the sugars are selected from the group consisting of functionalized monosaccharides, unfunctionalized monosaccharides, functionalized disaccharides, unfunctionalized disaccharides, functionalized polysaccharides and unfunctionalized polysaccharides; and the natural source is disproportionated rosin acid soap.

6. The process according to claim 1 wherein the positive retention enhancing component is selected from the group consisting of (poly)carboxylic acids, phosphinocarboxylic acids, polyacrylic acids, polymaleic acids, glucose, sucrose, saccharose, and sodium gluconate.

7. The process according to claim 1 wherein the at least one positive retention enhancing component is added in an amount of at least 15 ppm.

8. The process according to claim 1 wherein the at least one positive retention enhancing component is added in an amount of less than 5,000 ppm.

9. The process according to claim 1 wherein the polyvalent ions comprise calcium, magnesium, strontium, iron, barium, and/or aluminium.

10. The process according to claim 9 wherein either calcium or magnesium is present in the aqueous solution in an amount of less than 2,000 ppm.

11. The process according to claim 9 wherein either calcium or magnesium is present in the aqueous solution in an amount of less than 1,400 ppm.

12. The process according to claim 1 wherein sulphate anions are present in the aqueous salt solution in an amount of less than 75,000 ppm.

13. The process according to claim 1 wherein the sodium chloride source is a natural salt source containing more than 75% by weight of NaCl.

14. The process according to claim 1 wherein the aqueous solution is a saturated sodium chloride solution.

15. The process according to claim 1 wherein the at least one positive retention enhancing component is added in an amount of at least 50 ppm.

16. The process according to claim 15 wherein the at least one positive retention enhancing component is added in an amount of less than 350 ppm.

17. The process according to claim 1 wherein the at least one positive retention enhancing component is added in an amount of less than 350 ppm.

18. The process according to claim 1 wherein sulphate anions are present in the aqueous salt solution in an amount of less than 8,000 ppm.

19. The process according to claim 1 wherein the sodium chloride source is a natural salt source containing more than 90% by weight of NaCl.

20. The process according to claim 1 wherein the polyvalent cations are calcium.

* * * * *